(12) United States Patent
Liu et al.

(10) Patent No.: US 10,983,291 B2
(45) Date of Patent: Apr. 20, 2021

(54) HOLDER ELEMENT WITH INTEGRATED OPTICAL ARRANGEMENT TO OFFSET AN OUTPUT LIGHT PATH

(71) Applicant: Applied Optoelectronics, Inc., Sugar Land, TX (US)

(72) Inventors: Kevin Liu, Houston, TX (US); Kai-Sheng Lin, Sugar Land, TX (US); Hsiu-Che Wang, Rosenberg, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 0 days.

(21) Appl. No.: 16/561,531

(22) Filed: Sep. 5, 2019

(65) Prior Publication Data

US 2021/0072469 A1     Mar. 11, 2021

(51) Int. Cl.
*G02B 6/42* (2006.01)

(52) U.S. Cl.
CPC ......... *G02B 6/4214* (2013.01); *G02B 6/4237* (2013.01)

(58) Field of Classification Search
None
See application file for complete search history.

(56) References Cited

U.S. PATENT DOCUMENTS

| | | | |
|---|---|---|---|
| 7,623,788 B2 * | 11/2009 | Takahashi | G02B 6/4206 |
| | | | 359/629 |
| 8,737,784 B2 * | 5/2014 | Kawai | G02B 6/4292 |
| | | | 385/47 |
| 9,513,448 B2 * | 12/2016 | Sun | G02B 6/4214 |
| 10,054,762 B2 * | 8/2018 | Lin | G02B 27/1006 |
| 2002/0110313 A1 * | 8/2002 | Anigbo | G02B 6/29362 |
| | | | 385/24 |
| 2017/0059394 A1 * | 3/2017 | Ho | G02B 6/4284 |
| 2020/0041736 A1 * | 2/2020 | Liu | G02B 6/4214 |

\* cited by examiner

*Primary Examiner* — Rhonda S Peace
(74) *Attorney, Agent, or Firm* — Grossman Tucker Perreault & Pfleger, PLLC; Norman S. Kinsella

(57) ABSTRACT

The present disclosure is generally directed to a holder element, also generally referred to herein as a welding element, configured to couple an optical coupling receptacle to a substrate and provide an integrated optical arrangement to redirect light received from the optical coupling receptacle along a receive light path to an output light path that is offset from the receive light path.

16 Claims, 7 Drawing Sheets

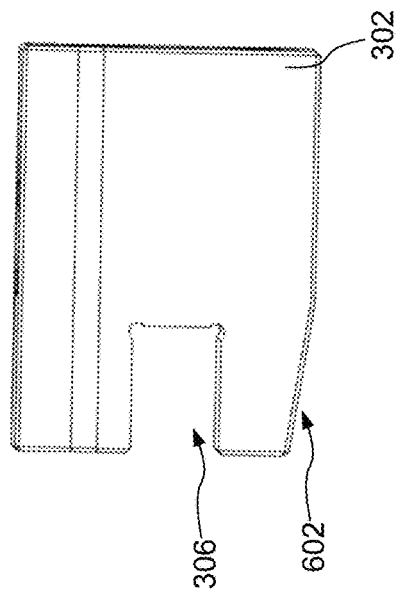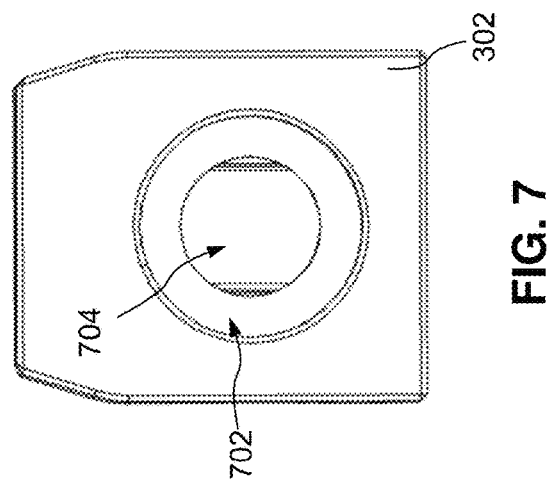

HOLDER ELEMENT WITH INTEGRATED OPTICAL ARRANGEMENT TO OFFSET AN OUTPUT LIGHT PATH

TECHNICAL FIELD

The present disclosure relates to optical communications and more particularly, to a holder element that couples an optical coupling receptacle to a substrate, e.g., via welding/soldering, and provides integrated optics to redirect light to overcome an optical path offset introduced by space constraints and standardization.

BACKGROUND INFORMATION

Optical transceivers are used to transmit and receive optical signals for various applications including, without limitation, internet data center, cable TV broadband, and fiber to the home (FTTH) applications. Optical transceivers provide higher speeds and bandwidth over longer distances, for example, as compared to transmission over copper cables. The desire to provide higher transmit/receive speeds in increasingly space-constrained optical transceiver modules has presented challenges, for example, with respect to thermal management, insertion loss, RF driving signal quality and manufacturing yield.

The data center market for optical transceivers continues to grow and systems such as those utilizing 100G CWDM4 transceivers remain in high demand. Reducing component costs in such optical transceivers while maintaining nominal performance and strict conformance with relevant standards raises numerous non-trivial challenges.

BRIEF DESCRIPTION OF THE DRAWINGS

These and other features and advantages will be better understood by reading the following detailed description, taken together with the drawings wherein:

FIG. 6 shows a side view of the holder element of FIG. 4 in accordance with an embodiment of the present disclosure.

FIG. 7 shows a rear view of the holder element of FIG. 4 in accordance with an embodiment of the present disclosure.

DETAILED DESCRIPTION

Figure 1:
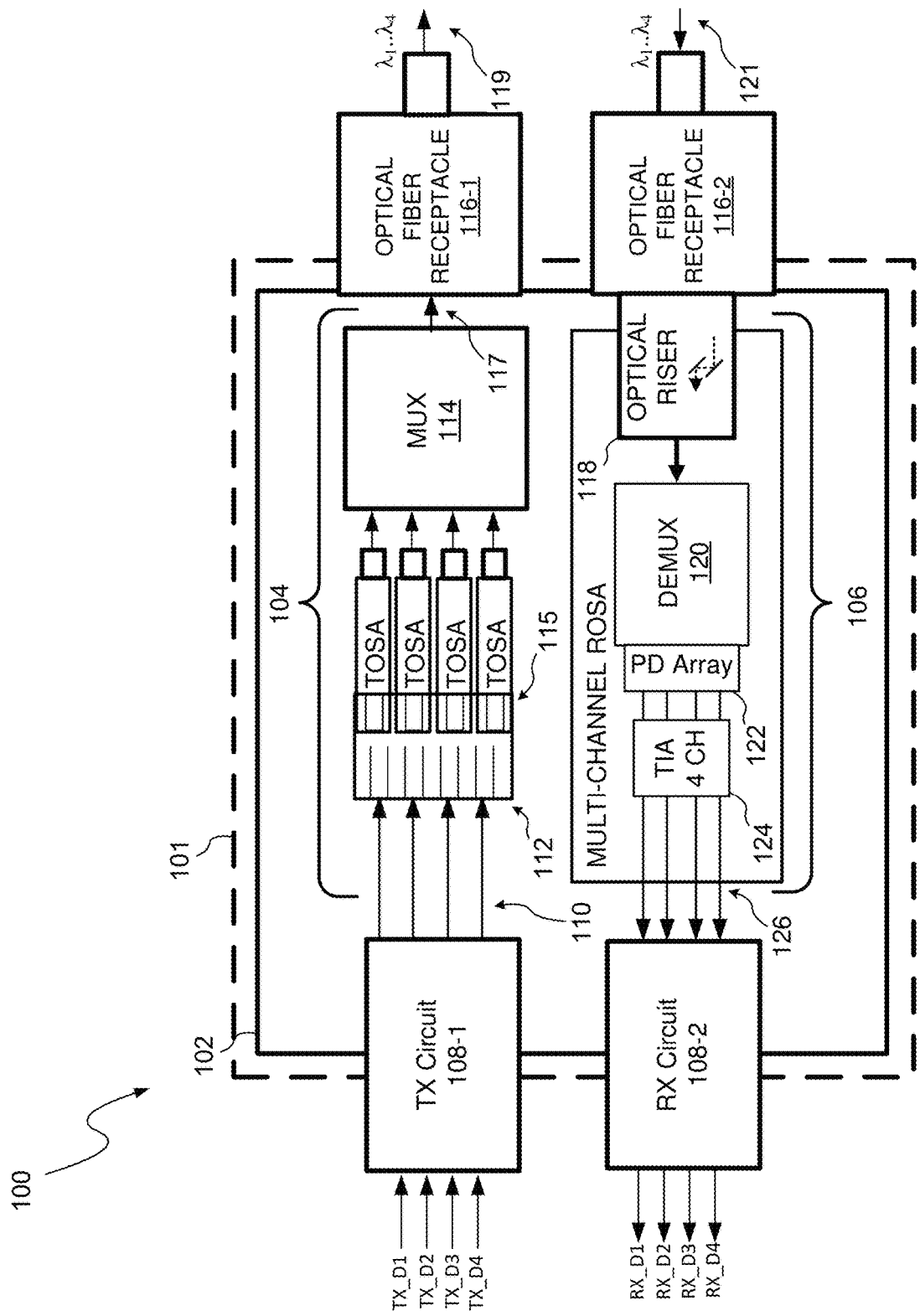
FIG. 1 is a schematic view of an example optical transceiver system consistent with embodiments of the present disclosure.

The present disclosure is generally directed to a holder element, also generally referred to herein as a welding element, configured to couple an optical coupling receptacle to a substrate and provide an integrated optical arrangement to redirect light received from the optical coupling receptacle along an input light path to an output light path that is offset from the receive light path. In more detail, the holder element includes a body that defines a cavity to hold at least one optical element and a receptacle/slot to at least partially receive and couple to an end of the substrate. The optical element includes at least first and second reflective surfaces disposed substantially parallel relative to each other. The body includes an input aperture through which the input light path (or first light path) extends between the first reflective surface within the cavity of the body and the optical coupling receptacle. The body further includes an output aperture to provide the output light path (or second light path) that extends from the second reflective surface and towards an optical component disposed on the substrate. The first and second reflective surfaces provide a light path therebetween that extends substantially transverse relative to the input and output light paths such that light incident the first reflective surface from the input light path gets offset/redirected to the output light path.

A holder element consistent with the present disclosure thus advantageously provides indirect coupling between an optical coupling receptacle and optical components mounted to the substrate. As generally referred to herein, indirect optical coupling refers to optical coupling between components based on two or more optical paths that redirect/change direction of light, e.g., via a mirror device or other intermediate optical element disposed between components such as an optical fiber. On the other hand, direct optical coupling as used herein generally refers to optical coupling between components along a relatively straight light path, e.g., without bends or turns, and without the necessity of an intermediate optical device such as a mirror or optical fiber.

In any event, and in accordance with an embodiment, the holder element allows the optical coupling receptacle to mount/attach to the substrate at an "offset" position that, essentially, prevents direct optical coupling based on the associated input light path being offset from a light path which aligns with inputs of optical components mounted to the substrate. This offset position allows for the substrate, and in particular the surface of the substrate on which optical components mount, to be disposed in close proximity of a sidewall of a transceiver housing without reserving space to accommodate the width of the optical coupling receptacle.

Thus, the overall footprint of the substrate, holder element and optical element gets reduced, and importantly, the substrate location within the housing can comport with a wide range of housing requirements.

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T dense wavelength division multiplexing (DWDM) grid. This disclosure is equally applicable to coarse wavelength division multiplexing (CWDM). In one specific example embodiment, the channel wavelengths are implemented in accordance with local area network (LAN) wavelength division multiplexing (WDM), which may also be referred to as LWDM. The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals.

The term substantially, as generally referred to herein, refers to a degree of precision within acceptable tolerance that accounts for and reflects minor real-world variation due to material composition, material defects, and/or limitations/peculiarities in manufacturing processes. Such variation may therefore be said to achieve largely, but not necessarily wholly, the stated characteristic. To provide one non-limiting numerical example to quantify "substantially," minor variation may cause a deviation of up to and including ±5% from a particular stated quality/characteristic unless otherwise provided by the present disclosure.

FIG. 1 shows a block diagram of a multi-channel optical transceiver module 100 consistent with embodiments of the present disclosure. The optical transceiver module 100 includes a housing 101, a substrate 102, a transmitter optical subassembly (TOSA) arrangement 104, a receiver optical subassembly (ROSA) arrangement 106. The housing 101 can comport with various enclosure standards, and preferably with SFF-8661 requirements.

The substrate 102 includes a transmit (TX) connecting circuit 108-1 and a receiver (RX) connecting circuit 108-2. The TX connecting circuit 108-1 and RX connecting circuit 108-1 include a plurality of leads printed/disposed on first end of the substrate 102 and can also include additional circuitry such as power converters, rectifiers, and so on. The first end of the substrate 102 at least partially extends from the housing 101 to allow for external circuitry to electrically couple to the TX connecting circuit 108-1 and RX connecting circuit 108-2.

The substrate 102 further includes TX traces 110 with a first end coupled to the TX connecting circuit 108-1 and a second end electrically coupled to the TOSA arrangement 104. The TOSA arrangement can include hermetically-sealed housing (See FIG. 2) that defines a cavity for receiving and securely holding a plurality of laser arrangements 115. The hermetically-sealed housing includes a pass-through device 112 having a plurality of traces (not shown) to provide power and driving signals to the plurality of laser arrangements 115, e.g., from the TX traces 110. Each laser arrangement of the plurality of laser arrangements 115 includes passive and/or active components such as a laser diode, monitor photodiode, laser diode driving (LDD) chip, optical isolator, and/or focus lens. The optical multiplexer 114 includes input ports to receive channel wavelengths from the TOSA arrangement 104 and an output port to output a multiplexed optical signal 117 having each of the received channel wavelengths. The multiplexed optical signal 117 gets launched on an external TX optical fiber by way of optical fiber receptacle 116-1 (which may also be referred to as an optical coupling receptacle). The optical multiplexer 114 comprises an arrayed waveguide grating (AWG), although this disclosure is not intended to be limited in this regard. In addition, the optical multiplexer 114 may not necessarily be included within the housing 101 depending on a desired configuration.

In operation, the TX connecting circuitry 108-1 provides driving signals (D1-D4) to drive the TOSA arrangement 104, e.g., from external driving circuitry. The TOSA arrangement 104 then receives the driving signals (D1-D4), e.g., via TX traces 110, and modulates the plurality of laser arrangements 115 to convert output four different output optical signals ($\lambda 1$-$\lambda 4$). The optical multiplexer 114 then combines the output optical signals into a multiplexed optical signal 117. The multiplexed optical signal 117 then launches on to the transmit optical fiber 119 by way of the optical fiber receptacle 116-1.

The RX connecting circuit 108-2 includes a plurality of traces to electrically couple the multi-channel ROSA arrangement 106 to external receiver circuitry. The multi-channel ROSA arrangement includes a holder element 118 with integrated optical riser, optical demultiplexer 120, photodiode (PD) array 122, and transimpedance amplifier 124. The holder element 118 includes a body that defines a slot (or substrate receptacle) to securely couple to an end of the substrate 102. In addition, the holder element 118 includes integrated optics to route incoming light from the RX optical fiber 121 along a first light path that extends along first plane (also referred to herein as a receive plane) to a second light path that extends along a second plane (also referred to herein as a demux plane), as will be discussed in further detail below.

The optical demultiplexer 120 comprises, for example, an arrayed waveguide grating (AWG) or other suitable device. An input of the optical demultiplexer 120 is aligned with the demux plane to receive an RX optical signal having a plurality of channel wavelengths. An output end of the optical demultiplexer 120 outputs separated channel wavelengths on to corresponding photodetectors of the PD array 122. The PD array 122 outputs electrical signals proportional to detected wavelengths. Transimpedance amplifier 124 includes circuitry to amplify and filter signals from the PD array 122.

Thus, in operation an optical signal having a plurality of channel wavelengths ($\lambda_1 \ldots \lambda_4$) is received by the multi-channel ROSA arrangement 106 by way of RX optical fiber 121 and optical fiber receptacle 116-2. The holder element 118 includes integrated optical components aligned with the RX optical fiber 121 to route/redirect the received light from the receive plane to the demux plane, with the receive and demux plane extending in parallel and having an offset distance of D1 relative to each other. The optical demultiplexer 120 is aligned to receive the optical signal from the holder element 118 and output each separated channel wavelength on to an associated photodiode of the PD array 122. The transimpedance amplifier 124 receives the electrical signals from the PD array 122 to provide receive signals (D1-D4). External receiver circuitry receives the receive signals (D1-D4) by way of the traces and RX connecting circuitry 108-2.

Figure 2:
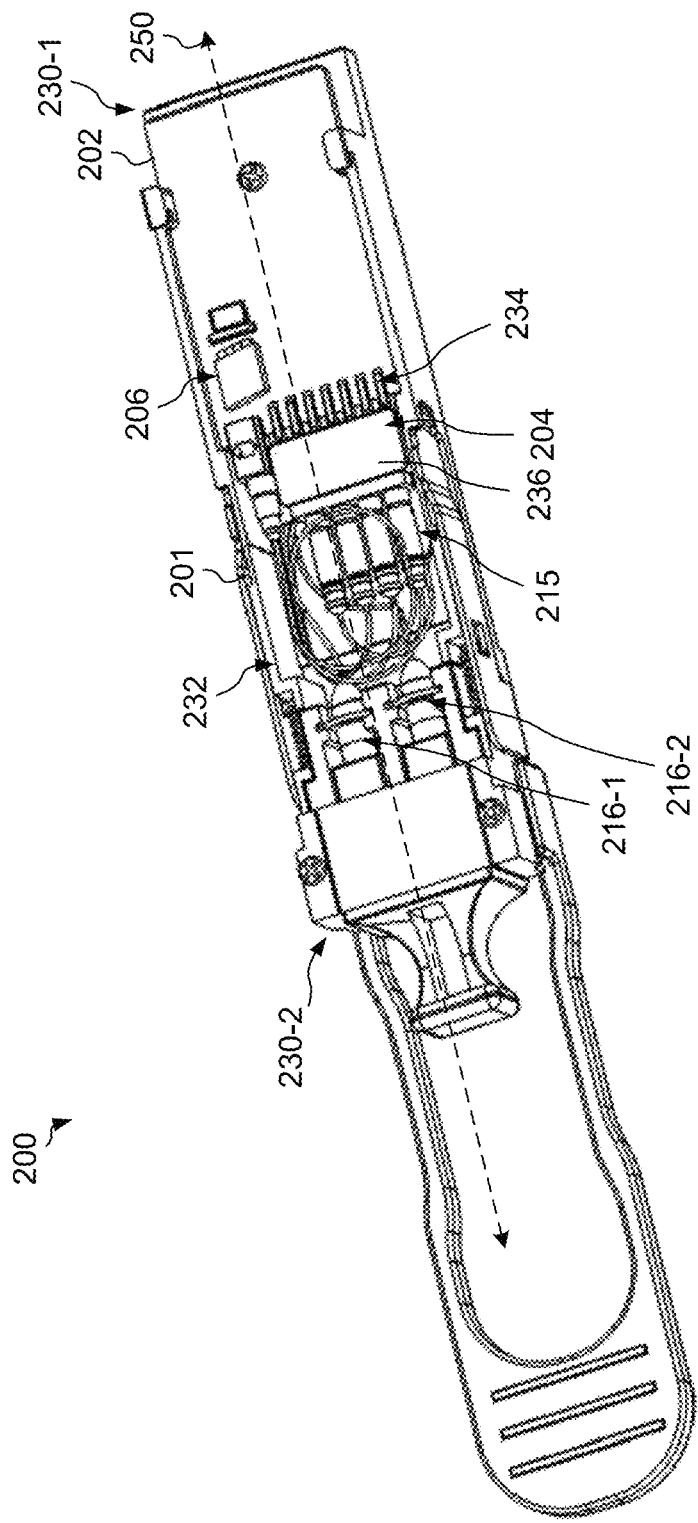
FIG. 2 is a perspective view of a pluggable optical transceiver module implementing the example optical transceiver system of FIG. 1 in accordance with an embodiment.

FIG. 2 shows an example pluggable optical transceiver module 200 (referred to herein as simply a transceiver module) consistent with the present disclosure. The example transceiver module 200 implements the multi-channel optical transceiver module 100 of FIG. 1 in a pluggable form factor, although other form factors are within the scope of this disclosure. The example transceiver module 200 includes a housing 201 without a cover portion to demonstrate additional aspects consistent with the present disclosure. The housing 201 includes a first end 230-1 that extends to a second end 230-2 along longitudinal axis 250. The first end 230-1 may also be referred to as an electrical coupling end and the second end 230-2 may also be referred to as an optical coupling end.

The housing 201 includes a plurality of sidewalls that define a cavity 232 therebetween. A substrate 202 mounts at least partially within the cavity 232 and includes traces (not shown) proximate the first end 230-1 for purposes of providing the TX and RX connecting circuits. A TOSA arrangement 204 mounts within a first portion of the cavity 232 and edge mounts to the substrate 202. As shown, the TOSA arrangement 204 includes a hermetically-sealed housing 236 with a plurality of laser arrangements disposed therein. The hermetically-sealed housing 236 electrically couples to the substrate 202 via electrical interconnects 234. A plurality of optical couplers 215 extend from the hermetically-sealed housing and are aligned with output ports, or apertures, of the same to receive channel wavelengths. Each of the plurality of optical couplers 215 include an associated optical fiber to optically couple with a multiplexing device, such as an AWG (not shown). The multiplexing device includes an output port optically coupled to the first optical fiber receptacle 230-2 by way of an intermediate optical fiber.

Figure 3:
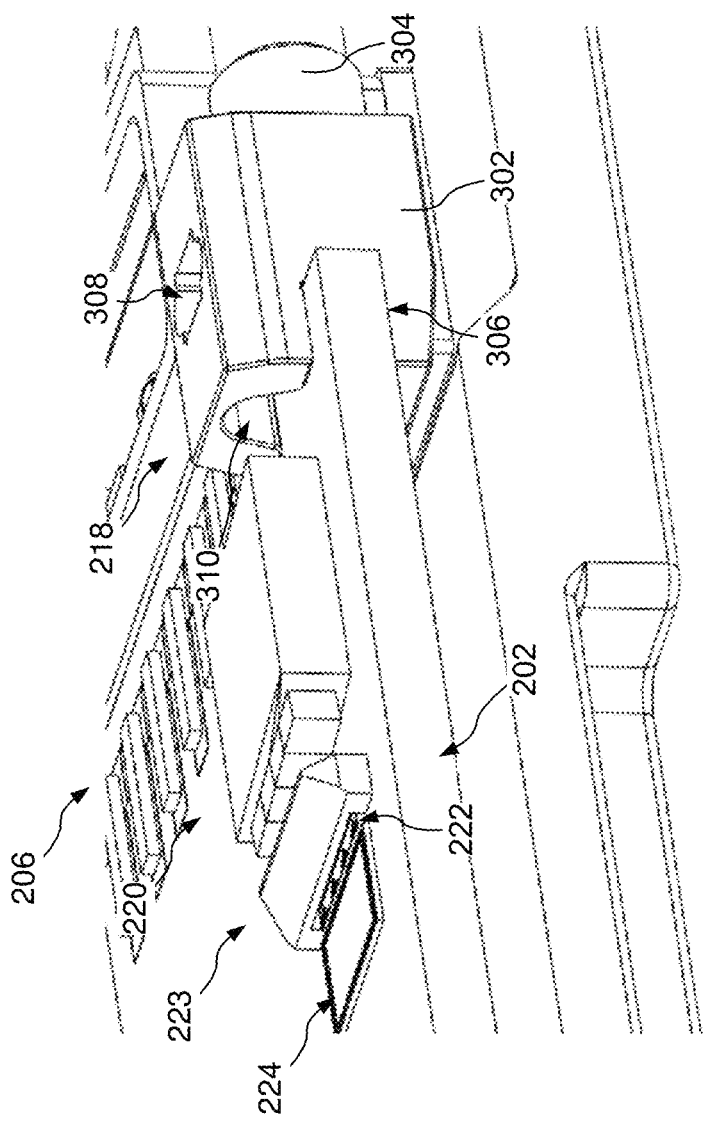
FIG. 3 shows an enlarged view of the pluggable optical transceiver module of FIG. 2 in accordance with an embodiment.
Figure 4:
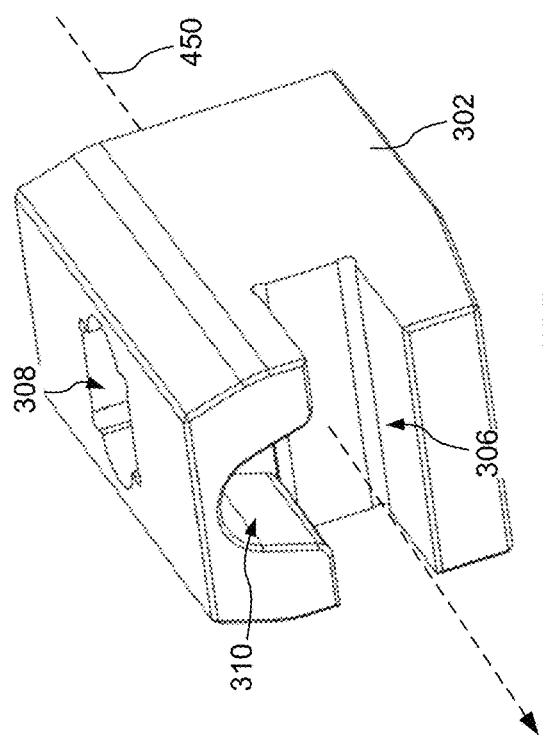
FIG. 4 shows a perspective view of a holder element consistent with an embodiment of the present disclosure.
Figure 5:
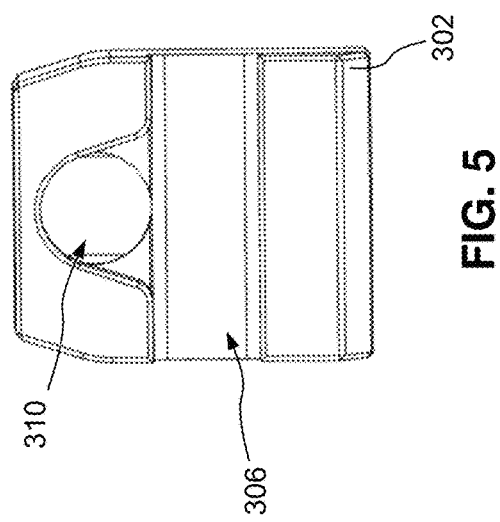
FIG. 5 shows a front view of the holder element of FIG. 4 in accordance with an embodiment of the present disclosure.
Figure 8:
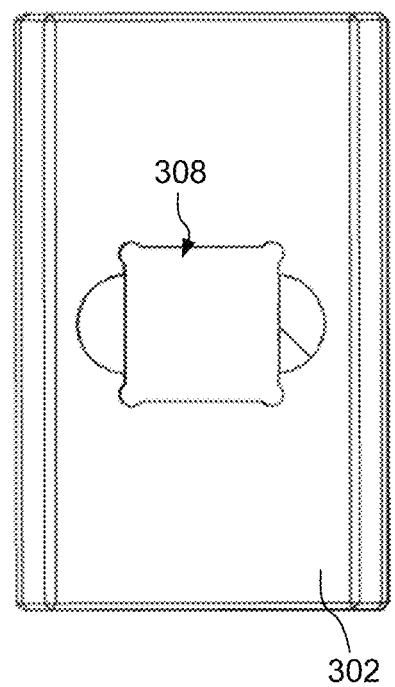
FIG. 8 shows a top view of the holder element of FIG. 4 in accordance with an embodiment of the present disclosure.

The ROSA arrangement 206 includes a plurality of components mounted to a surface of the substrate 202. Turning to FIG. 3, the ROSA arrangement 206 is shown isolated from the housing 201 to more clearly illustrate aspects of the ROSA arrangement 206. The arrangement of FIG. 3 may also be referred to as an on-board ROSA arrangement 206, whereby each of the ROSA components are coupled to the substrate 202.

As shown, the ROSA arrangement 206 includes a holder element 218, an optical demultiplexer 220, a PD array 222, an optical turning mirror 223, and a transimpedance amplifier 224 mounted to the substrate 202.

The holder element 218, which may also be referred to herein simply as a holder 218, includes a body 302 and has a first end to couple to an optical coupling receptacle 304 and a second end that defines a slot 306 (or recess) to edge mount to an end of the substrate 202. The slot 306 provides at least one mating surface for coupling to the substrate. The holder element 218 includes a plurality of optical components to provide an integrated optical riser, which is discussed below in further detail. The body 302 of the holder element 218 includes a through hole 308 that transitions to a cavity for securely holding the plurality of optical components. The body 302 further defines an aperture 310 to output light received via the optical coupling receptacle 304, which may also be referred to as an output aperture.

The optical demultiplexer 220 includes an input port aligned with the aperture 310 to receive channel wavelengths. An output region of the optical demultiplexer 220 outputs separated channel wavelengths. The optical turning mirror 223 is aligned with the output region of the optical demultiplexer 220. The optical turning mirror 223 direct lights towards the PD array 222, and more particularly, to photosensitive regions that receive corresponding channel wavelengths and output a proportional electrical signal. The transimpedance amplifier 224 receives the electrical signals from the PD array 222 and amplifies the signals for output via the traces 126 and RX connecting circuit 108-2 (See FIG. 1).

FIGS. 4-8 collectively show an embodiment of the holder 218 in isolation. As shown, the holder 218 is defined by a body 302. The body 302 is formed from a monolithic, single-piece of material or from multiple pieces depending on a desired configuration. The material forming the body 302 comprises, for example, a metal, metal alloy or any other suitable rigid material. Preferably, the material forming the body 302 comprises a metal or metal alloy suited for soldering/welding the same to the substrate 202.

The body 302 includes first and second ends that extend along a longitudinal axis 450. The first end includes a slot 306 (or recess 306) that extends substantially transverse to the longitudinal axis 450. The slot 306 includes dimensions that allow for the same to at least partially receive an end of the substrate 202. A top portion of the first end of the body 302 includes a generally arcuate profile/shape and at least partially defines the slot 306 and an output aperture 310. A bottom portion of the first end of the body 302 also at least partially defines the slot 306 and includes an angled surface to provide a tapered region 602 (See FIG. 6).

Figure 9:
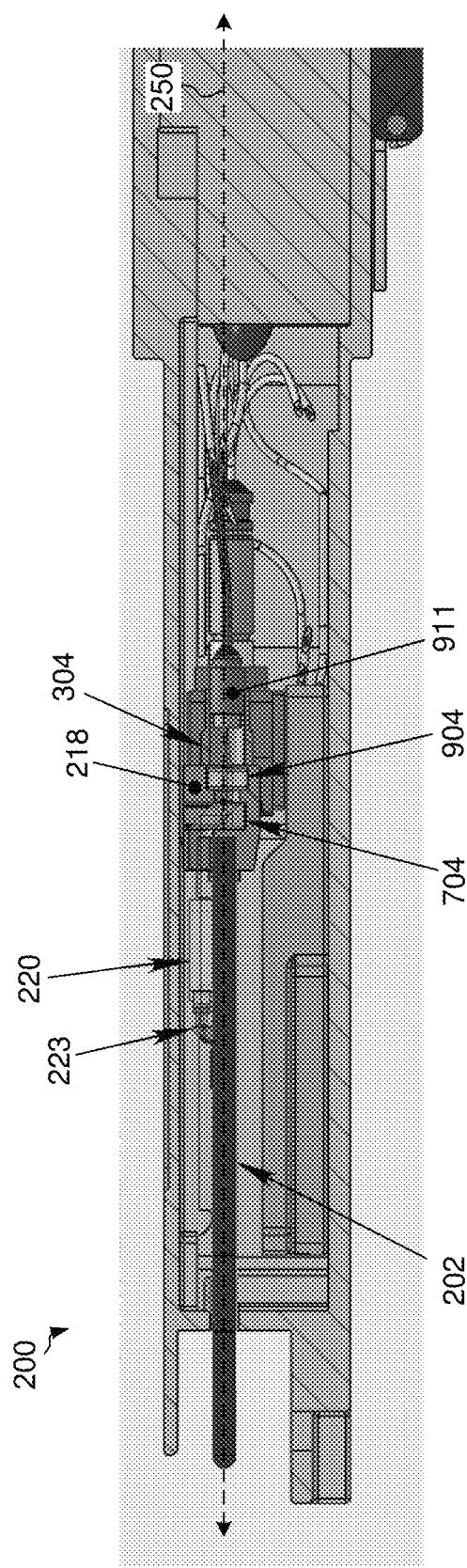
FIG. 9 shows an example cross-sectional view of the pluggable optical transceiver module of FIG. 2 in accordance with an embodiment of the present disclosure.

The body 302 further defines a cavity 704 to securely hold optical components such as a mirror device 904 (See FIG. 9). A top portion of the body 302 defines through hole 308 to receive and securely hold a mirror device within the cavity 704. The output aperture 310 extends through the body 302 into the cavity 704. The body 302 further includes a second end that defines an input aperture 702 (See FIG. 7). The input aperture 702 also extends through the body 302 into the cavity 704. As discussed further below, the input aperture 702 is configured to couple to an optical coupling receptacle to receive a multiplexed optical signal along a receive plane 1002 (or input plane), and the output aperture 310 is configured to output the multiplexed optical signal along a demux plane 1002 (or output plane), with the receive plane 1004 and demux plane 1002 being offset from each other by a distance of OD1.

Figure 10:
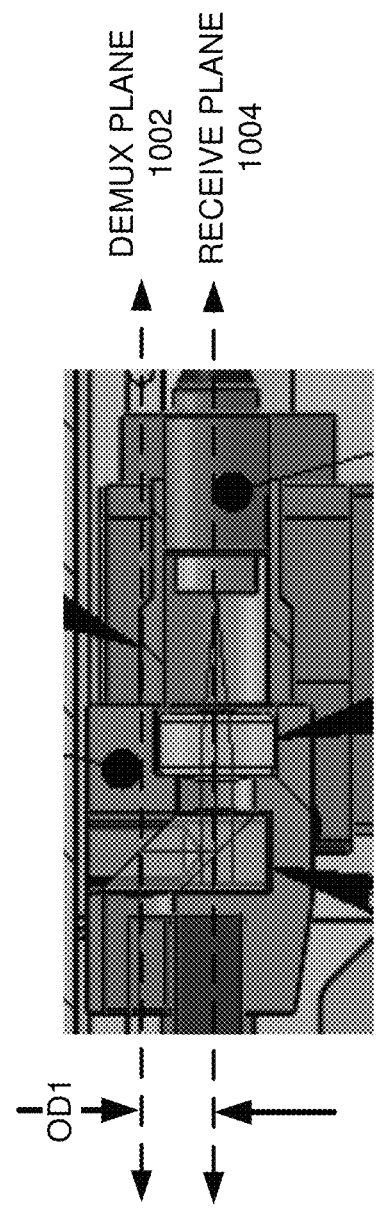
FIG. 10 shows an enlarged view of the cross-sectional view of FIG. 9 in accordance with an embodiment of the present disclosure.

FIGS. 9 and 10 show a cross-sectional view of the optical transceiver module 200 in accordance with an embodiment. As shown, each of the substrate 202, the holder 218, and the optical coupling receptacle 304 extend in a collinear/concentric manner along the longitudinal axis 250. The optical coupling receptacle 304 defines a cavity to at least partially receive a fiber ferrule 911 to optically couple with an external RX optical fiber, e.g., RX optical fiber 121. In the embodiment of FIG. 9, this results in the optical coupling receptacle 304 outputting a multiplexed optical signal along a receive plane 1004 which intersects with the substrate 202.

In an embodiment, the holder element 218 redirects the multiplexed optical signal from the receive plane 1004 to the demux plane 1002 based on a mirror device 904 disposed within the body of the holder 218. Mirror device 904 includes at least first and second reflective surfaces that extend parallel relative to each other and substantially transverse relative to the demux and receive planes 1002, 1004. The first reflective surface is disposed at a predetermined location within the holder 218 that intersects with a first light path that extends from the optical coupling receptacle towards the substrate 202 along the receive plane. The second reflective surface is disposed at a predetermined location within the holder 218 that intersects with a second light path that extends along the demux plane 1002. Each of the first and second reflective surfaces of the mirror device 904 are angled and disposed in alignment with each other to provide a substantially transverse light path which is substantially transverse relative to each of the first and second light paths. The first and second reflective surfaces extend at a substantially equal angle relative to the first/second light paths.

Thus, in operation the channel wavelengths emitted along the first light path (or receive light path) of the receive plane 1002 get reflected by the first reflective surface of the mirror device 904 along the transverse light path and towards the second reflective surface of the mirror device 904. The reflected channel wavelengths incident the second surface of the mirror device 904 get reflected along the second light path (or output light path) of the demux plane 1002. The light path of the demux plane 1002 optically aligns with, for instance, an input region/port of the optical demultiplexer 220 (FIG. 2) to separate the channel wavelengths for detection purposes. The light path of the receive plane 1004 may also be referred to as a first light path, the light path extending substantially transverse between the first and second surfaces of the mirror device 904 may also be referred to as a second light path, and the light path of the demux plane 1002 may also be referred to as a third light path.

The offset distance OD1 between the first and second light paths of the receive plane 1004 and demux plane 1002 allows for routing of channel wavelengths, in a general sense, "around" the substrate 202. The distance between the first and second reflective surfaces of the mirror device 904 at least partially establish the offset distance OD1. In an embodiment, the offset distance OD1 measures greater than the thickness of the substrate 202.

In accordance with an aspect of the present disclosure a holder element for use in an optical subassembly is disclosed. The holder comprising a body that defines a cavity to receive and couple to at least one optical element, a substrate receptacle defined at a first end of the body with at least one mating surface to couple to a substrate, an input aperture at a second end of the body to receive an optical signal into the cavity along a first light path, an output aperture disposed at the first end of the body to pass the received optical signal from the cavity along a second light path, a mirror disposed in the cavity having at least one reflective surface, the mirror providing a light path within the cavity that extends substantially transverse between the first and second light paths such that incident wavelengths received along the first light path get launched on to the second light path.

In accordance with another aspect of the present disclosure an optical subassembly is disclosed. The optical subassembly comprising a housing defining a cavity, a substrate disposed in the cavity, the substrate having at least one mounting surface and at least one optical component mounted to the at least one mounting surface, a holder element with a slot coupled to an end of the substrate, the holder element comprising a body that defines a cavity, an input aperture at a second end of the body to receive an optical signal into the cavity along a first light path, an output aperture disposed at the first end of the body to pass the received optical signal from the cavity along a second light path, the second light path intersecting with an input port of the at least one optical component of the substrate, and a mirror device disposed in the cavity, the mirror device providing a light path within the cavity that extends substantially transverse between the first and second light paths such that incident wavelengths received along the first light path get launched on to the second light path.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. A holder element for use in an optical subassembly, the holder comprising:
    a body that defines a cavity to receive and couple to at least one optical element;
    a substrate receptacle defined at a first end of the body with at least one mating surface to couple to a substrate;
    an input aperture at a second end of the body to receive an optical signal into the cavity along a first light path;
    an output aperture disposed at the first end of the body to pass the received optical signal from the cavity along a second light path;
    a mirror disposed in the cavity having at least one reflective surface, the mirror providing a light path within the cavity that extends substantially transverse between the first and second light paths such that incident wavelengths received along the first light path get launched on to the second light path; and
    wherein the substrate receptacle comprises a slot to at least partially receive a substrate, wherein the slot is at least partially defined by the output aperture and the output aperture optically aligns with at least one optical component disposed on the substrate based on the substrate being disposed within the slot.

2. The holder element of claim 1, wherein the substrate receptacle is configured to edge mount to the substrate via the slot.

3. The holder element of claim 2, wherein the slot extends substantially transverse relative to a longitudinal axis of the body.

4. The holder element of claim 1, wherein the input aperture comprises an optical coupling receptacle, the optical coupling receptacle having a longitudinal axis that extends concentrically with the first optical path.

5. The holder element of claim 1, wherein the first optical path is disposed on a receive plane that extends through at least a portion of the substrate.

6. The holder element of claim 5, wherein the second optical path extends along an output plane that extends along a surface of the substrate.

7. The holder element of claim 5, wherein the first and second light paths extend substantially parallel with each other and have a predetermined offset distance OD1 extending therebetween.

8. The holder element of claim 1, further comprising a focus lens disposed within the cavity along the first light path.

9. The holder element of claim 1, wherein the mirror comprises a second reflective surface disposed substantially parallel relative to the first reflective surface.

10. The holder element of claim 9, wherein the first and second reflective surfaces extend at a first and second angle, respectively, relative to the first light path, and wherein the first and second angles are substantially equal.

11. An optical subassembly, the optical subassembly comprising:
    a housing defining a cavity;
    a substrate disposed in the cavity, the substrate having at least one mounting surface and at least one optical component mounted to the at least one mounting surface;
    a holder element with a slot coupled to an end of the substrate, the holder element comprising:
        a body that defines a cavity;
        an input aperture at a second end of the body to receive an optical signal into the cavity along a first light path;
        an output aperture disposed at the first end of the body to pass the received optical signal from the cavity along a second light path, the second light path intersecting with an input port of the at least one optical component of the substrate;
        a mirror device disposed in the cavity, the mirror device providing a light path within the cavity that extends substantially transverse between the first and second light paths such that incident wavelengths received along the first light path get launched on to the second light path; and wherein the mirror device comprises first and second reflective surfaces, wherein the first light path intersects with the first reflective surface and the second light path intersects with the second reflective surface.

12. The optical subassembly of claim 11, wherein the body of the holder element is welded to the substrate.

13. The optical subassembly of claim 11, wherein the first light path extends along at least one plane that extends through a portion of the substrate.

14. The optical subassembly of claim 11, wherein the second light path extends substantially parallel with the first light path.

15. The optical subassembly of claim 11, wherein the first and second reflective surfaces extend at first and second angles relative to the first optical path, respectively, and wherein the first and second angles are substantially equal.

16. The optical subassembly of claim 11, wherein the holder element further comprises a focus lens disposed along the first optical path within the cavity.

* * * * *